US006666418B1

(12) United States Patent
Scanlan

(10) Patent No.: US 6,666,418 B1
(45) Date of Patent: Dec. 23, 2003

(54) DECORATIVE DEVICE FOR RETAINING DISC-LIKE OBJECTS

(76) Inventor: Michael Scanlan, 2405 Echo Park Ave., Los Angeles, CA (US) 90026

( * ) Notice: Subject to any disclaimer, the term of this patent is extended or adjusted under 35 U.S.C. 154(b) by 0 days.

(21) Appl. No.: 10/135,115

(22) Filed: Apr. 30, 2002

(51) Int. Cl.[7] .............................................. F16M 11/00
(52) U.S. Cl. ............................... 248/176.1; 206/308.1; 206/310
(58) Field of Search .............................. 248/176.1, 127, 248/125.7, 125.9, 309.1, 346.1, 346.03, 349.1, 310, 312; 24/40; 360/100.1; 206/308.1, 310

(56) References Cited

U.S. PATENT DOCUMENTS

| | | | | |
|---|---|---|---|---|
| 3,081,054 A | * | 3/1963 | Westervelt | 248/537 |
| 3,276,734 A | * | 10/1966 | Goldblatt | 248/176.1 |
| 3,310,267 A | * | 3/1967 | Koehler | 248/176.1 |
| 5,515,968 A | * | 5/1996 | Taniyama | 206/310 |
| 5,593,032 A | | 1/1997 | Staley | 206/309 |
| 5,706,938 A | | 1/1998 | Niehaus | 206/308.1 |
| 5,740,907 A | | 4/1998 | McCloy | 206/307 |
| 5,857,575 A | * | 1/1999 | Watson et al. | 211/40 |
| 5,887,713 A | * | 3/1999 | Smith et al. | 206/308.1 |
| 6,089,384 A | | 7/2000 | Watson et al. | 211/40 |
| 6,164,445 A | * | 12/2000 | Cooper | 206/308.1 |
| 6,237,763 B1 | * | 5/2001 | Lau | 206/308.1 |
| 6,250,461 B1 | * | 6/2001 | Hu | 206/310 |
| 6,394,266 B1 | * | 5/2002 | Chou | 206/308.1 |
| 6,398,022 B1 | * | 6/2002 | Mou et al. | 206/308.1 |
| 6,561,347 B1 | * | 5/2003 | Lax | 206/308.2 |

FOREIGN PATENT DOCUMENTS

GB        2267638    * 12/1993

* cited by examiner

*Primary Examiner*—Ramon O. Ramirez
*Assistant Examiner*—Tan Le
(74) *Attorney, Agent, or Firm*—Connolly Bove Lodge & Hutz LLP

(57) ABSTRACT

An optical information disc retaining device (10) including a cone shaped base (12) having a protrusion (16) disposed on a convex receiving member (14). The optical information disc (30) is pivotally mounted and retained on the device (10). The relative geometry of the retaining device (10) will hold an optical information disc (30) in a pivotal and protective manner at a multitude of angles, whereby the entire perimeter (60) of the disc (30) is forbidden to come in contact with a generally horizontal surface on which the device (10) and disc (30) is placed. The device (10) provides means for readily accessing and retaining discs (30) with a single hand in a manner which avoids touching the information portion of the disc. In one embodiment, the retaining device (10) is machined from multiple pieces. In another embodiment, the retaining device (10) is continuously formed from a single material to produce novel and decorative indicia (52).

5 Claims, 14 Drawing Sheets

DECORATIVE DEVICE FOR RETAINING DISC-LIKE OBJECTS

FEDERALLY SPONSORED RESEARCH

Not Applicable

SEQUENCE LISTING OR PROGRAM

Not Applicable

BACKGROUND OF THE INVENTION

1. Field of the Invention

The present invention relates to the field of optical information disc storage means and more particularly, the present invention relates to short term protective storage devices providing readily available access to optical information discs; for example: compact discs (CD's), digital video discs (DVD's), CD-ROM's (read only memory) and the like.

2. Statement of Relevant Art

The dramatic growth in the use of personal computers and the popularity of compact discs has resulted in a tremendous increase in the overall use of optical information discs. While previously compact discs were primarily dedicated to the storage of audio information for playing back music, these discs are now commonly used with personal computers for accessing information and for storing computer programs.

The term optical information disc, as used herein, and in claims, is broadly defined as any "optically readable media" encompassing any medium on which information may be optically read buy a laser, including, but not limited to, data that represents audio, video, text, images, computer data, or any other combination thereof.

The typical optical information disc is a polycarbonate, annular information carrier containing a concentric spiral of pits representing digital information that can be optically read with a low power laser. One planar surface of the disc is smooth (read-side of the disc) while the opposite planar surface of the disc has the concentric spiral of pits molded into it (printed side of the disc). A thin layer of reflective metal is evaporated onto the pitted surface of the disc. An acrylic-type coating is then deposited onto the metal surface of the disc encapsulating said metal surface. In practice, the disc is removably attached to a compact disc player spindle mechanism through a center hole in the optical information disc or compact disc. The spindle mechanism rotates the disc at high speed. A laser will then enter through the smooth surface of the disc (read-side), focus onto the pitted surface and reflect the spiral of pits forming a data stream. The data stream is read by a diode sending the data to a digital-to-analog converter eventually creating music, video, or other desired information. The disc may be any size including the standard 4.7 inches diameter, or from the 3 inch diameter digital disc to the larger 8 or 12 inch diameter laser disc. All references to the optical information disc and related media will heretofore be called compact disc.

The compact disc comprises an annular stacking ring near the center portion of the disc between the center hole and the digital information. The stacking ring is a non-critical surface portion of the disc designed to allow the disc to be handled, stacked one on top of each other, or to be secured and stored in devices like a jewel case or a CD player without damaging the information.

The jewel case is generally made of a clear plastic material and is approximately 5 inches high by 5½ inches long and ⅜ inch thick. The disc is removably secured into the jewel case by a centrally located circular array of flexible teeth, generally referred to as a hub.

Additionally, soft booklet packages are now available for storing compact discs. In such a storage package, the discs may be located within plastic sleeves for storing the discs adjacent to one another in a row within the package. Other conventional storage devices for compact discs provide for the storage of the discs contained within their jewel cases in which the disc is originally purchased. These devices are designed to store many discs which are typically stacked or otherwise arranged.

The problem with these existing disc storage devices is that they do not allow the user to readily access the disc. Their purpose is a pure protective storage device. When a person using such a device changes between discs, the person is required to remove the currently used disc from the computer or audio disc player and return the disc to its original package. The user then must open another disc package. This is a very time consuming process that entails numerous manipulations requiring both hands. A person who is in a hurry or does not have both hands available will often simply lay the disc on a flat surface such as a table top and remove the required disc from its package. The problem with doing this is that the disc may easily be damaged when it is not located within a protective environment. This obviously is very undesirable because a damaged disc must be replaced.

The problem of disc access is even more common now with the increase in use of CD-ROMs (read only memory) and CD-RW (re-write) discs associated with personal computers. It is typical that a person using a computer will have a number of discs which are used in conjunction with the person's personal computer. These primary discs may hold the most commonly used software or reference materials such as dictionary or thesaurus, or a person may use a number of compact discs to listen to music via the disc drive while working on the computer. In ordinary usage, the person may repeatedly exchange the disc in the disc drive throughout the day. Similarly, a person using an audio compact disc player in a car may have a limited number of favorite discs which are bought along on a given trip.

As noted, because the conventional storage devices are inconvenient to use, many users simply place the disc on an available surface without regard to possible damage to the information storage surface of the disc. This is especially true when the discs are repeatedly exchanged. This often results in a damaged disc which is a significant problem especially in the field of computers because replacement of computer software stored on these discs is not as nearly as simple as replacing a damaged audio compact disc.

Storage devices have been suggested in the patent literature which generally comprise of a disc retaining hub. For example, U.S. Pat. No. 5,887,713 to Smith et al. demonstrates the general retaining means or "flexible tooth hub" typically associated with jewel cases and the like.

U.S. Pat. No. 5,706,938 to Niehaus shows a modified jewel case storage device that dispenses with the external casing and applies the compact disc retaining device to a ring binder type of storage means.

Similarly, devices that display or advertise compact discs incorporating a flexible tooth hub have been suggested in U.S. Pat. No. 6,089,384 to Watson et al. and U.S. Pat. No. 6,146,445 to Cooper U.S. Pat. No. 5,740,907 to McCloy and U.S. Pat. No. 5,593,032 to Staley demonstrate disc storage devices that dispense of the conventional toothed hub retaining device and hold the discs at their outer edge.

While these devices may be suitable for the particular purpose they address, they would not be as suitable for the purposes of the present invention as heretofore described.

In view of the foregoing, it will be appreciated that providing a compact disc holding device which retains one [(1) or (2)] or a plurality of discs therein, that permits the ready removal and protective placement of such discs with a,single hand; and which may alleviate a person of laborious manipulations while working with multiple discs would be a significant advancement in the art.

Accordingly, it is a general object of the present invention to provide a new and novel device for holding one [(1) or two (2)] or a plurality of compact discs in a manner that provides ready access to compact discs while also retaining the, compact discs in an unconventional pivotal fashion while protecting the compact discs from damage.

Another object of the present invention is to provide a compact device for retaining a compact disc that is simple and easy to use, requiring only one hand.

An additional object of the present invention is to provide a device for retaining compact disc in which the disc may be applied to the device from numerous angles.

A related object of the present invention is to provide a device for retaining a compact disc whereby a substantial degree of accuracy and concentration is not required from a person in order to use the device.

A further object of the present invention is to provide a decorative and aesthetically pleasing device for retaining a compact disc in a manner that the device may compliment the environment in which it relates.

A still further object of the present invention is to provide a device for retaining a compact disc that is simple and inexpensive to manufacture.

These and further objects of the present invention will become apparent from the following detailed description of the preferred embodiments when viewed in light of the drawings.

DETAILED DESCRIPTION OF THE ILLUSTRATED EMBODIMENTS

Before the present compact disc retaining device is disclosed and described, it is to be understood that this invention is not limited to the particular configurations, process steps, finishing steps and materials disclosed herein as such configurations, process steps, finishing steps and materials may vary somewhat. It is also to be understood that the terminology employed herein is used for the purpose of describing particular embodiments only and is not intended to be limiting since the scope of the present invention will be limited only by the appended claims and equivalents thereof.

Figure 1:
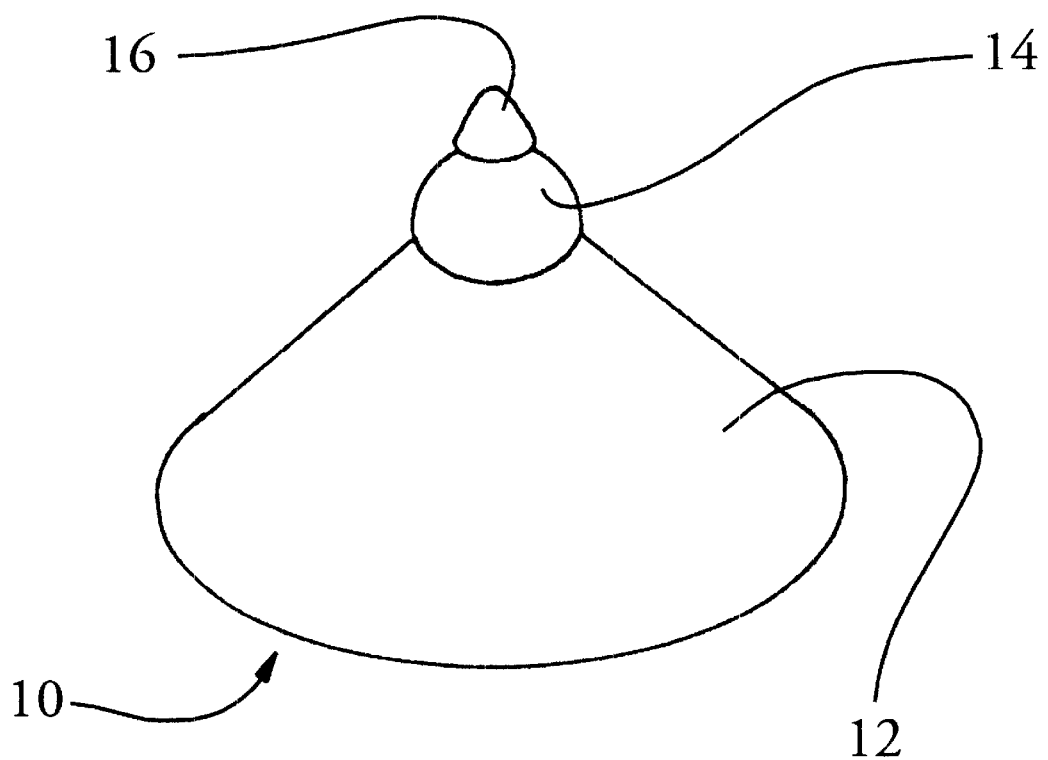
FIG. 1 is a view in perspective of the compact disc retaining device of the present invention.

A preferred embodiment of the present invention 10, as illustrated in FIG. 1, generally comprises but is not limited to, a conical base 12 on which is centrally disposed a spherical or convex pivotal support surface 14. The convex support surface 14 having a dimension generally more than a central receiving aperture 34 of a compact disc 30 (shown in FIG. 4). An alignment retention protrusion 16 is centrally disposed on the top of the convex support surface 14 and is provided to aid location of the compact disc 30 (FIG. 4) on the device 10 and prevent alighting of the compact disc 30 from the convex support surface 14.

Figure 2:
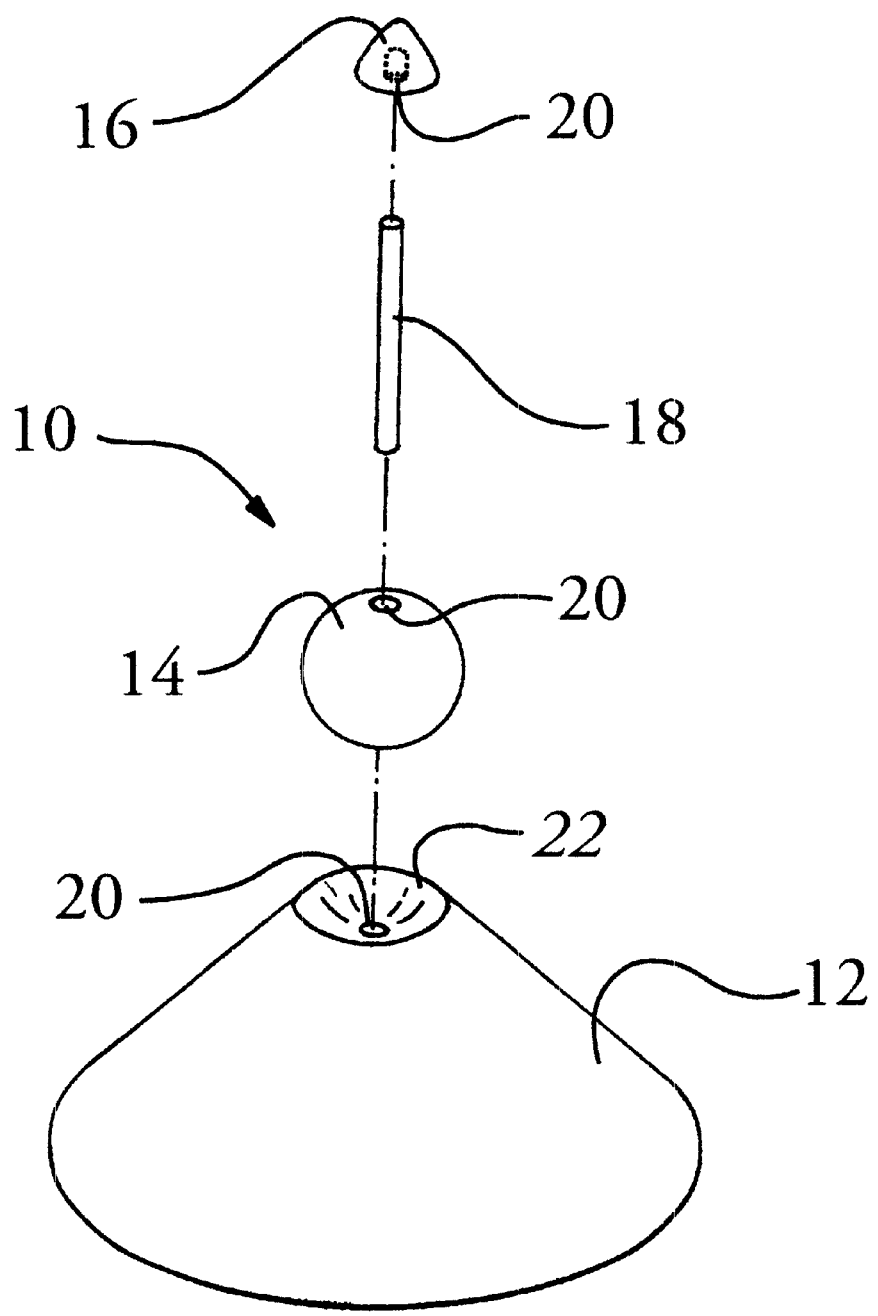
FIG. 2 is an exploded view suggesting a process embodiment of the compact disc retaining device.
Figure 3:
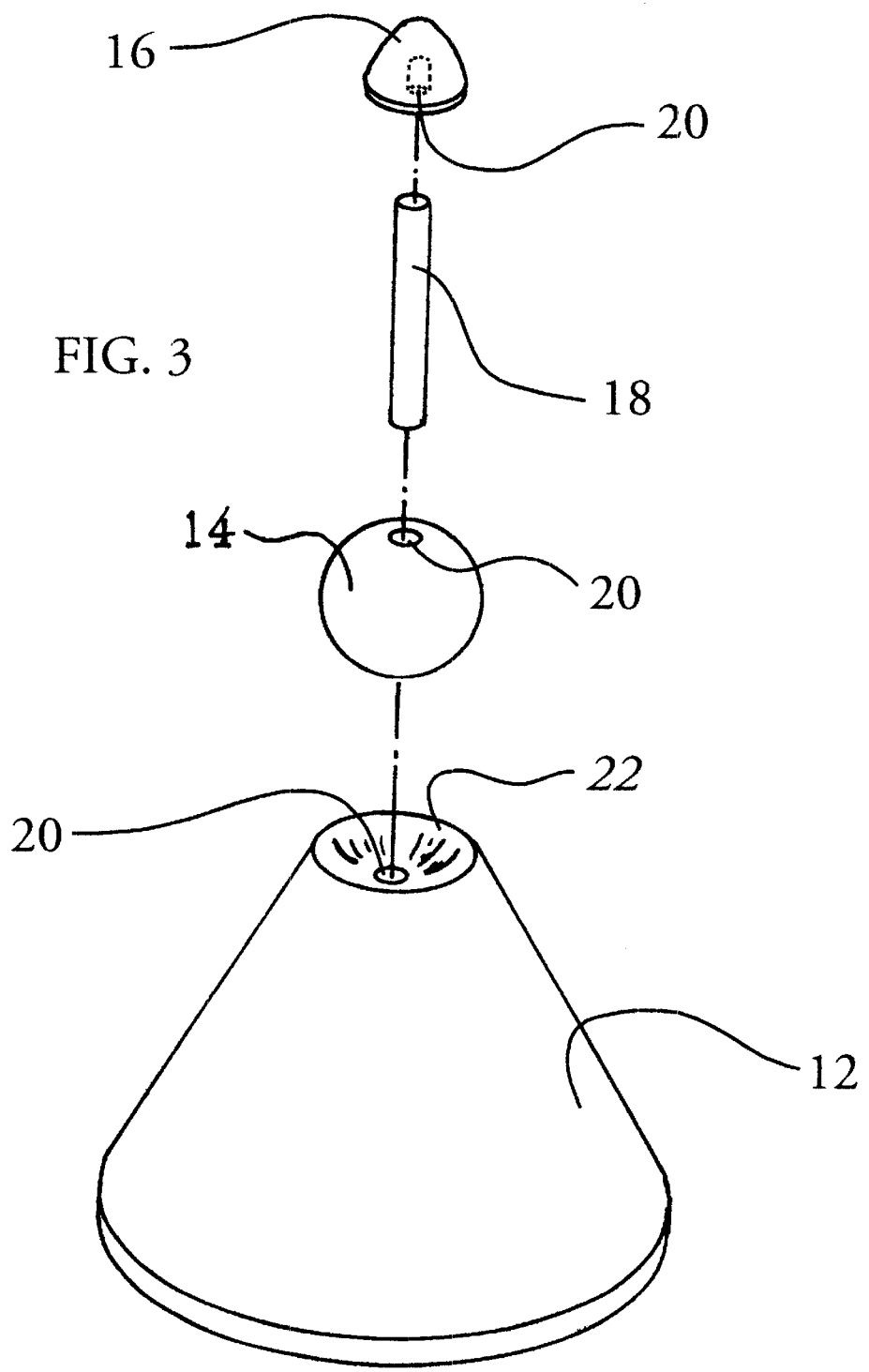
FIG. 3 is an exploded view suggesting a process of an alternative embodiment of the compact disc retaining device of the present invention, wherein the base member is elongated.
Figure 5:
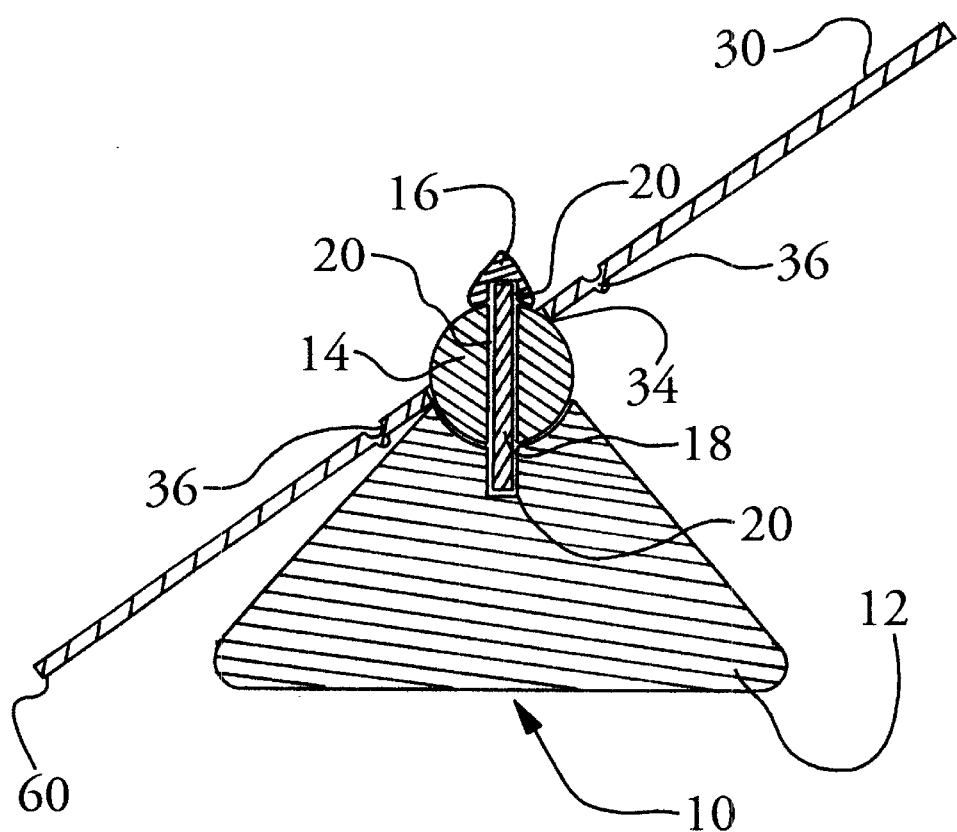
FIGS. 5, 5a and 5b are cross sectional views of FIG. 2 (compact disc retaining device assembled and dissected through the middle) with one (1) compact disc [attached and] positioned on the device at different angles.
Figure 6:
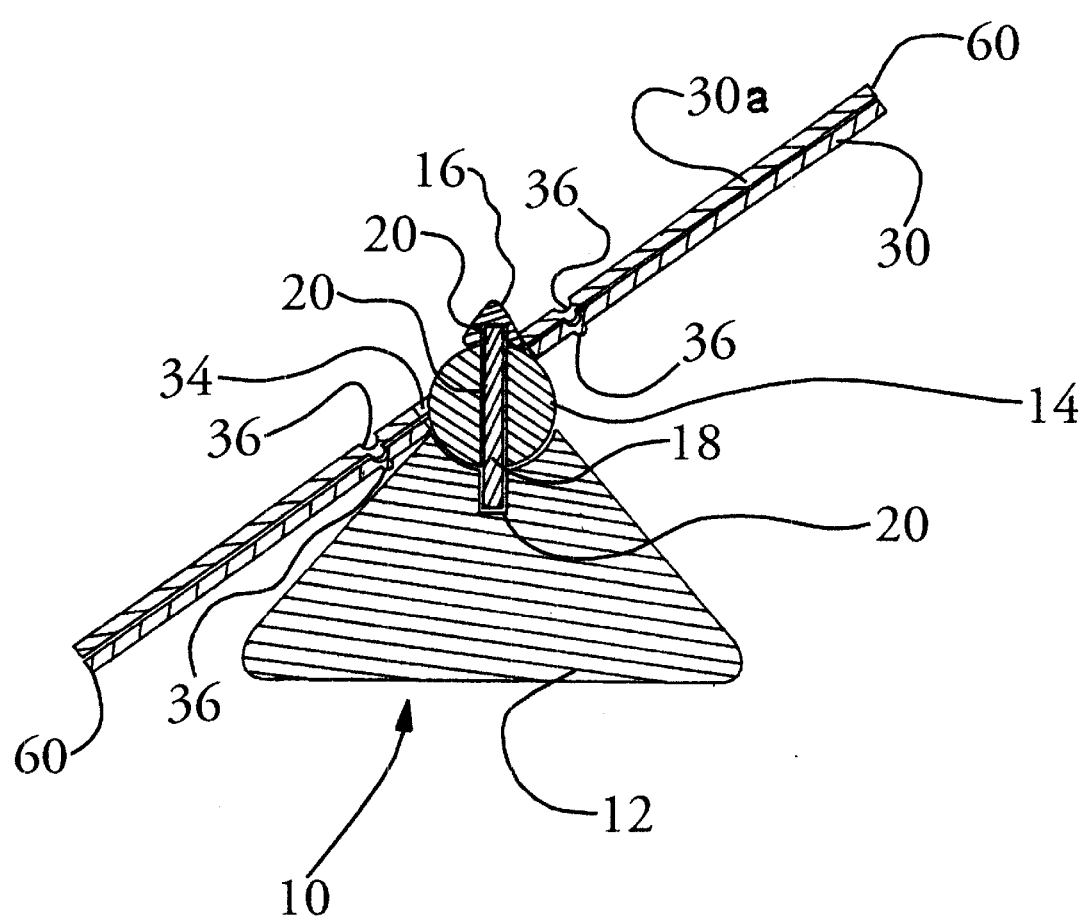
FIG. 6 is a cross sectional view of the compact disc retaining device with two (2) compact discs attached.

FIGS. 2–3 illustrate exploded perspective views of preferred embodiments of the present invention. Base member 12 and alignment retention protrusion 16 may be machined from aluminum, while spherical support or convex pivotal surface 14 may preferably be made from chromed steel or brass. Base member 12, convex support surface 14 and alignment retention protrusion 16 may be fastened together with a pin or shaft 18 by mechanical or friction fastening means through a hole 20 in the alignment retention protrusion 16, spherical support surface 14 and finally in to a hole 20 disposed in a concave receiving part 22 at the top of the base member 12. FIGS. 5–6 also illustrates in cross section this suggested means of fabrication.

Figure 4:
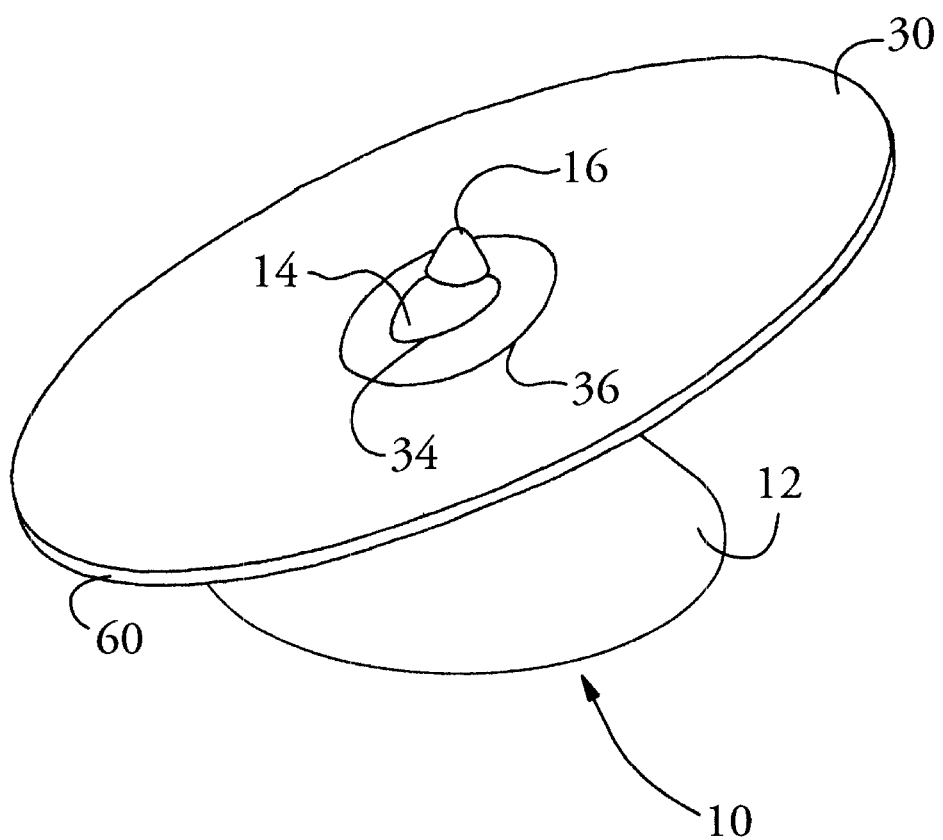
FIG. 4 is a view in perspective of the compact disc retaining device illustrating a typical placement of an attached compact disc.
Figure 5A:
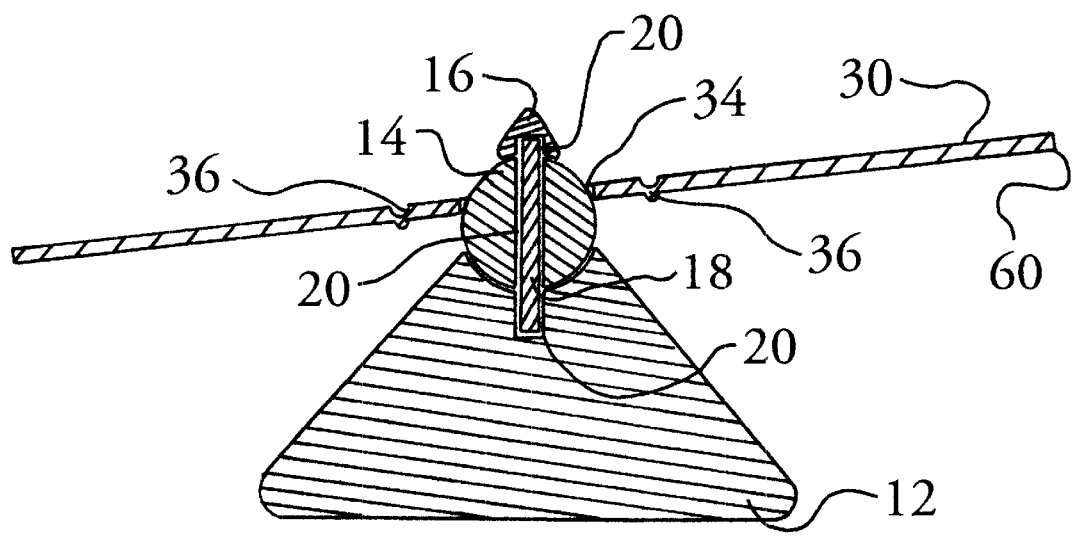
Figure 5B:
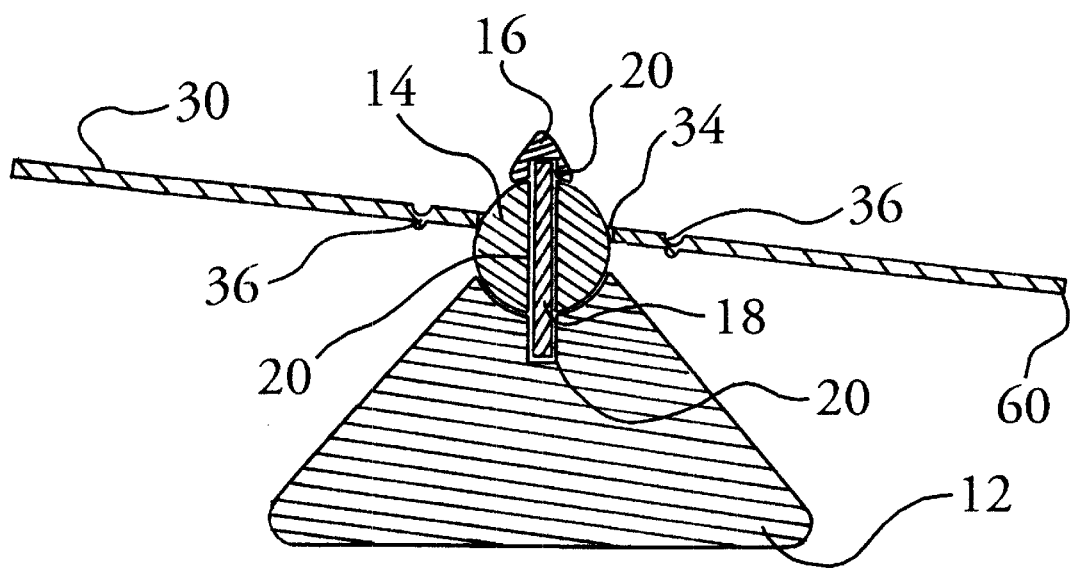
Figure 7:
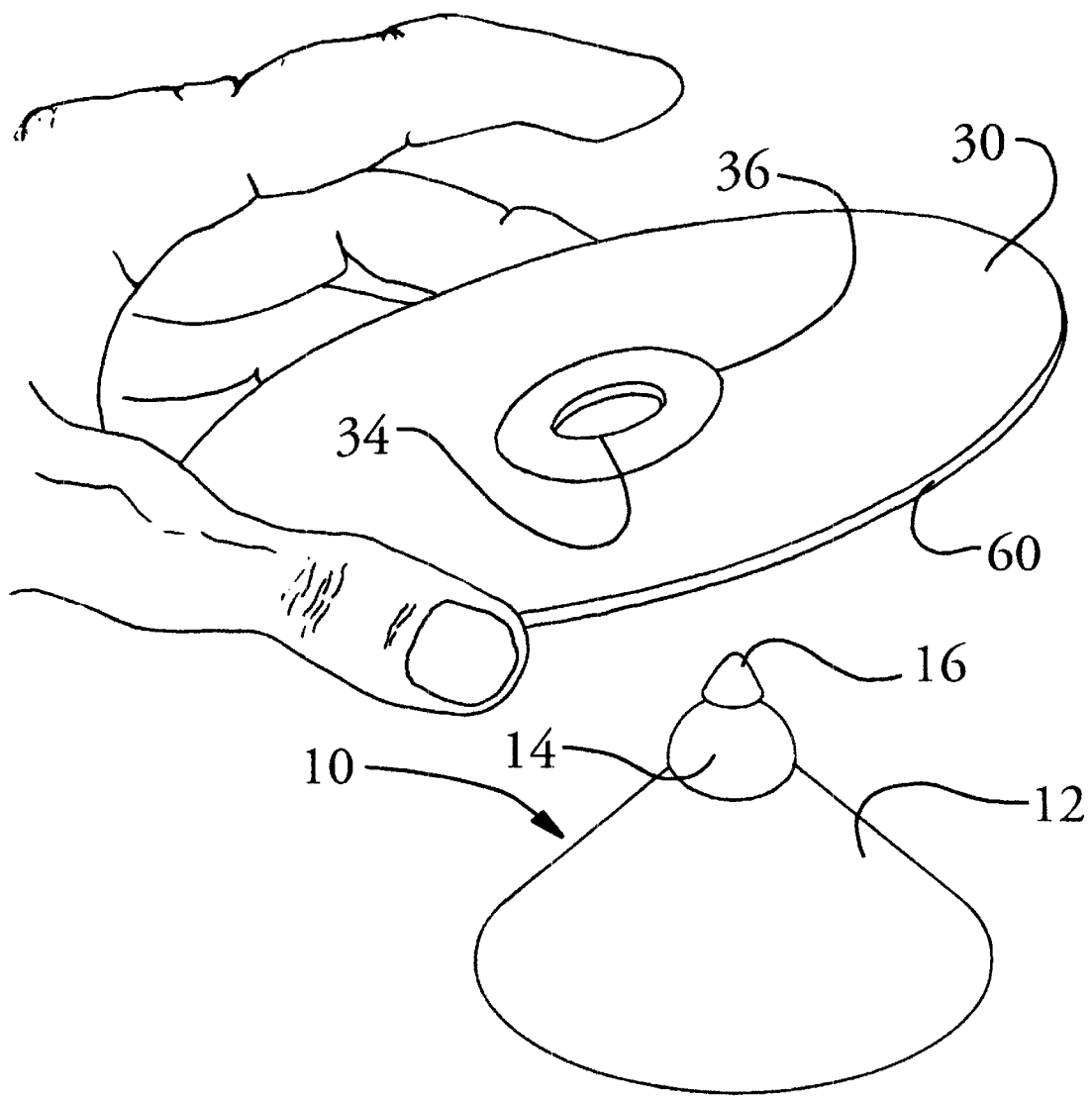
FIG. 7 is a view in perspective of the compact disc retaining device illustrating the general alignment of the compact disc for placement on the compact disc retaining device of the present invention.
Figure 8:
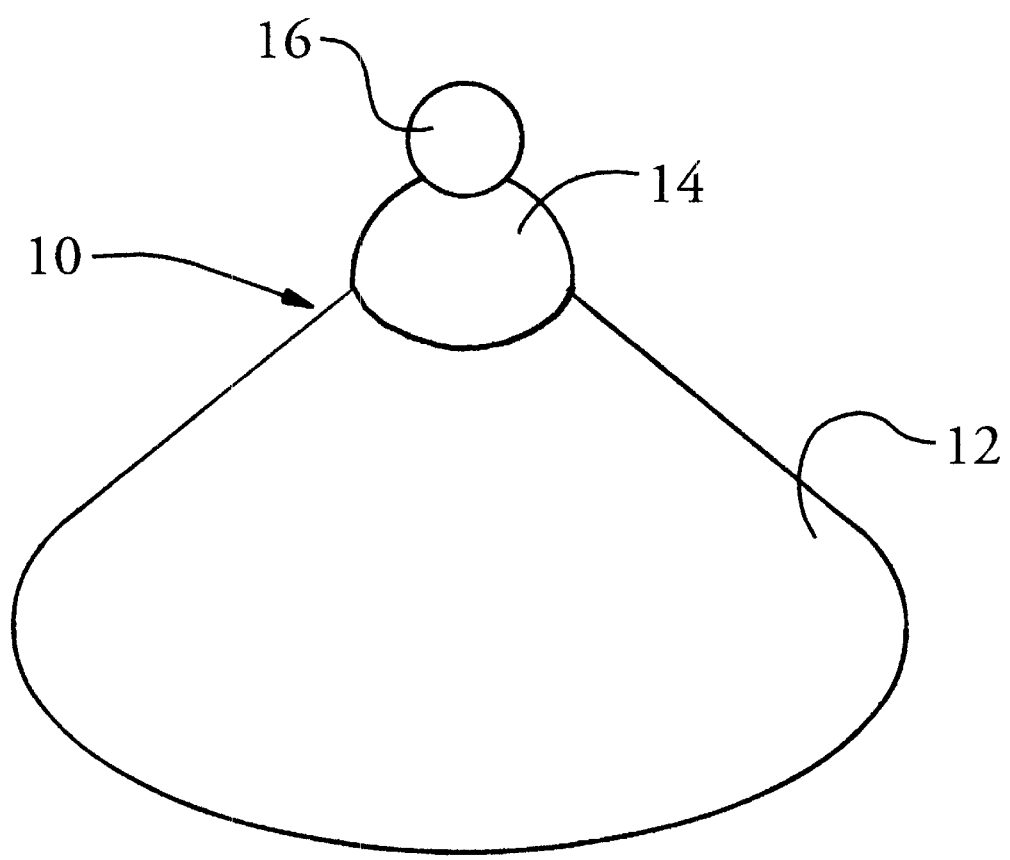
FIG. 8 illustrates an alternative embodiment of the present invention in which the alignment retention protrusion is convex.

The compact disc 30 as illustrated in FIG. 7 is generally [aliened] aligned with, and simply placed on the compact disc retaining device 10 from a multitude of angles. The compact disc is then retained on a non-critical area of its central receiving aperture 34 and retained in a pivotal and protective manner on the convex support surface 14 by the alignment retention protrusion 16 as illustrated in FIG. 4. The relative dimensions of the alignment retention protrusion 16, convex support surface 14 and the base member 12 provide elevated pivotal retention of the compact disc 30, so that the entire perimeter 60 of the compact disc 30 is forbidden to come in contact with a horizontal surface on which the device 10 and disc 30 are placed. The first compact disc 30 placed on the device 10 makes only partial contact with the non critical surface aperture of the disc 34 and partial contact with the convex pivotal support surface 14 and at extreme angles, alignment retention protrusion 16 of the device 10, as illustrated in sectional views FIGS. 5, 5a and 5b. A second disc 30a may be placed on the first compact disc 30 placed on the device 10, and may be retained in a protective manner against both the annular stacking ring 36 and the alignment retention protrusion 16 as illustrated in FIG. 6.

The compact disc retaining device 10 of the present invention is not limited to the above suggested means of fabrication or any particular process steps, finishing steps or materials and therefor, further embodiments, such as examples illustrated in FIGS. 9–12 may be printed on, sculpted, molded, cast, machined or otherwise constructed in a single form or in multiple pieces to produce novel and decorative designs from a myriad of materials, including but not limited to metal, plastic, acrylic, stone, wood, glass, and crystal styrene.

Figure 9:
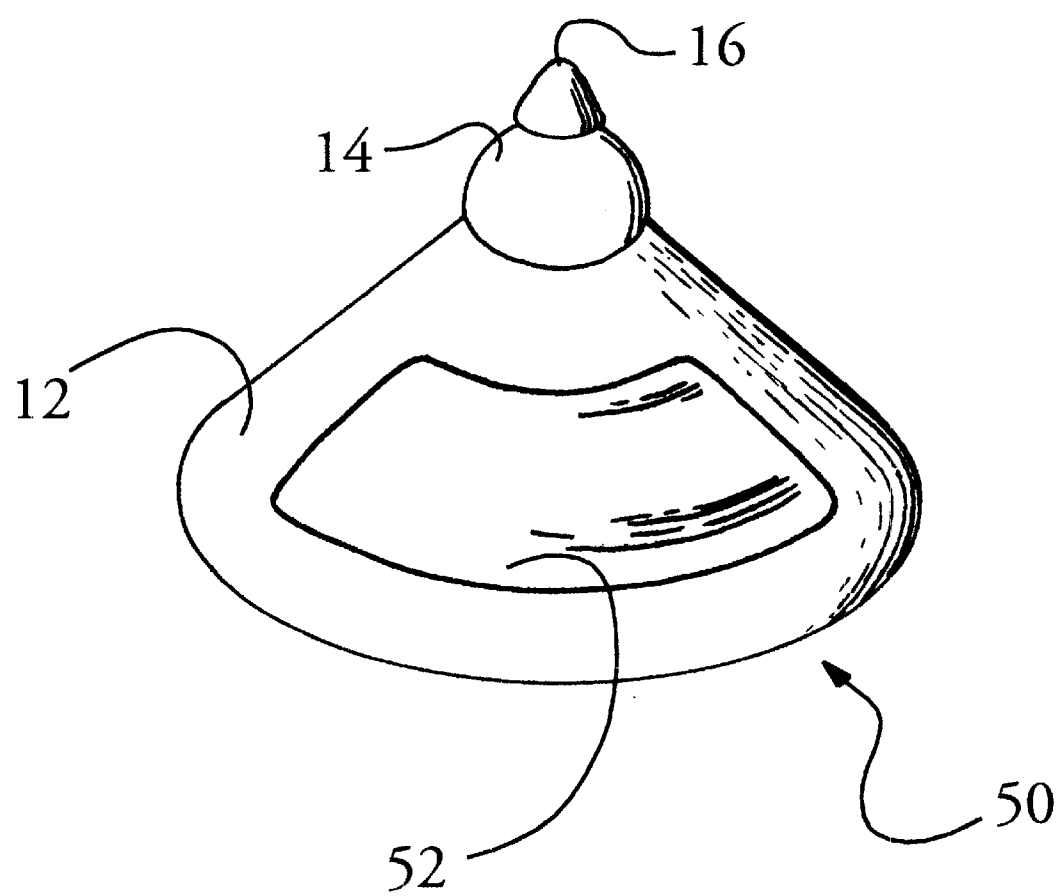
FIGS. 9–12 are illustrative examples of further embodiments of the compact disc retaining device of the present invention in which indicia is attached to, formed on, and encapsulated in, respectively.
Figure 10:
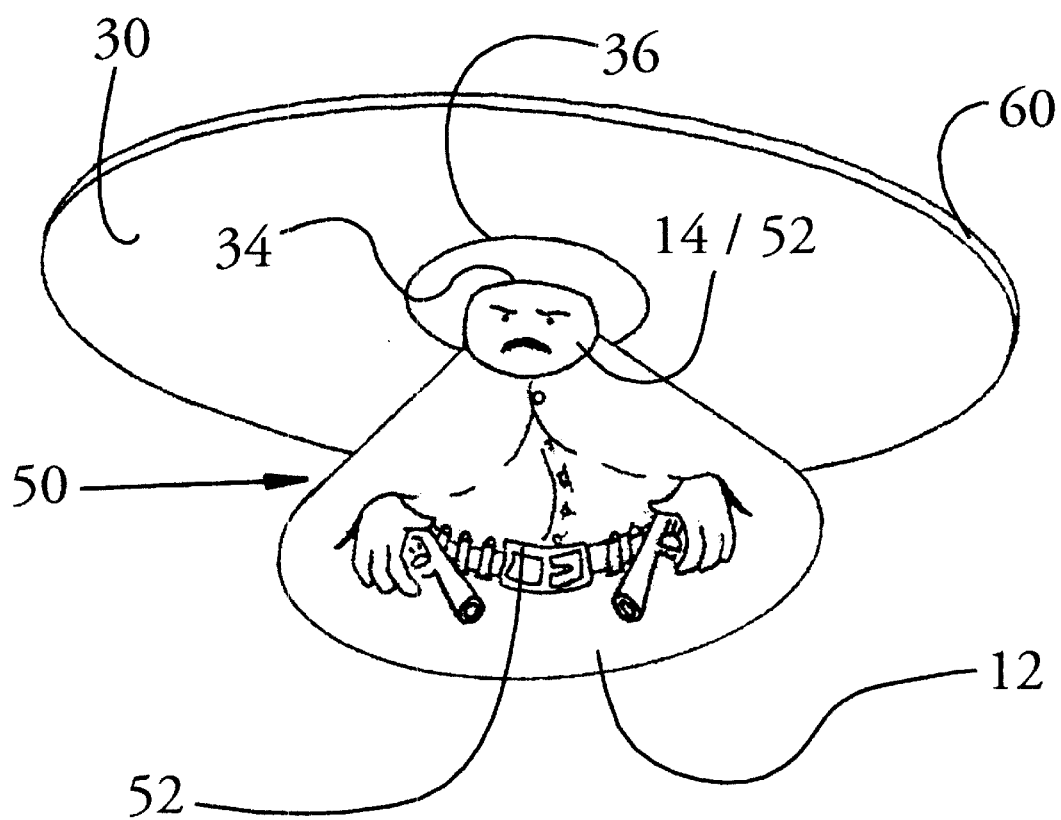
Figure 11:
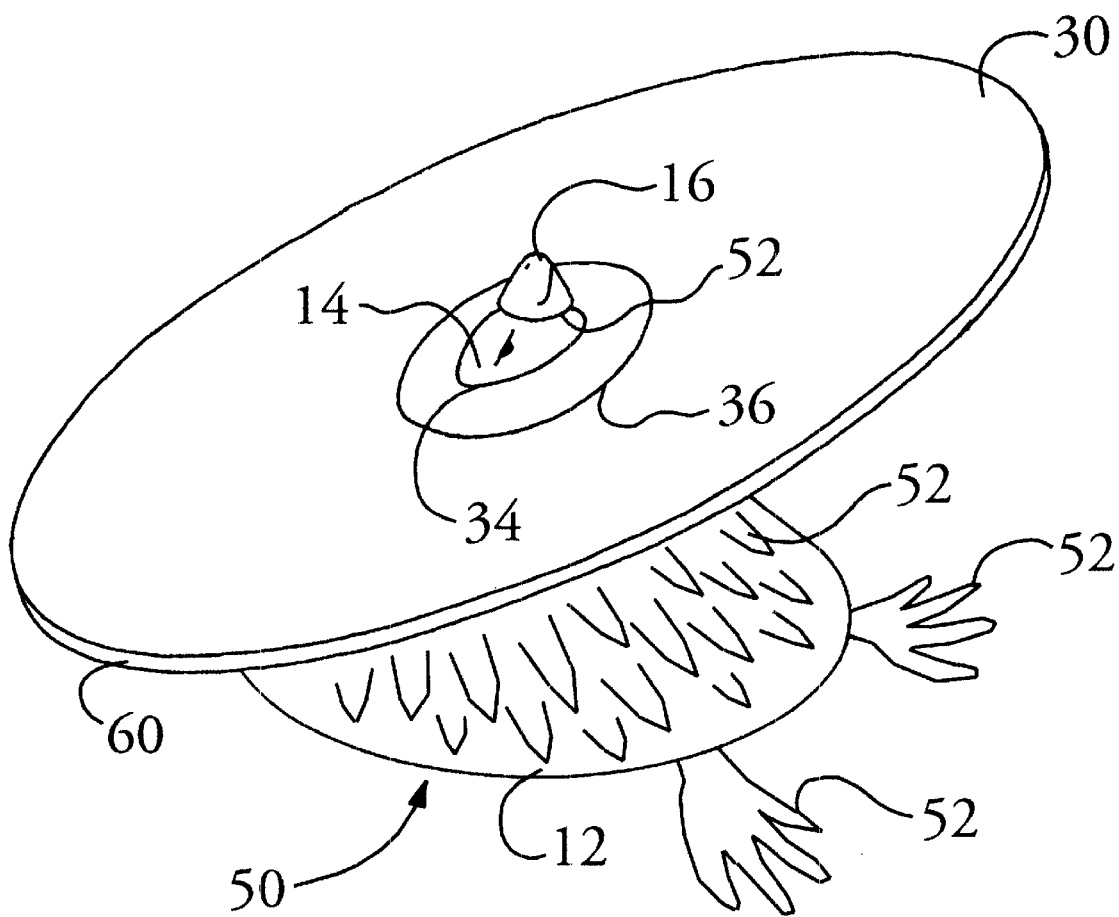

In these further embodiments of the compact disc retaining device of the present invention, hook and loop type fastening means (not shown) may be applied to the underside of base member 12. Advantageously, indicia 52 can be applied to the compact disc retaining device as illustrated in FIGS. 9–11. These embodiments of the inventive compact disc retaining device are generally shown at 50.

Figure 12:
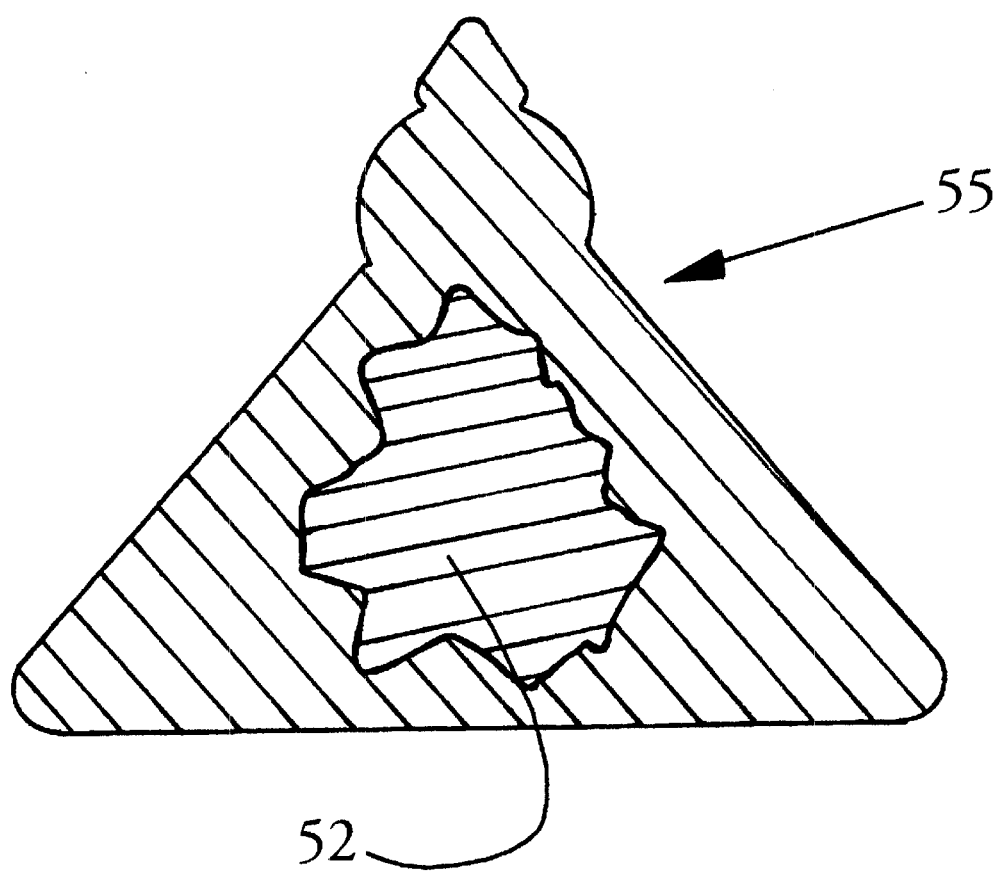

FIG. 12 illustrates a sectional view of yet another alternative embodiment of the present invention wherein the disc retaining device may be formed continuously in a transparent material in order to internally encapsulate indicia 52. This embodiment of the inventive disc retaining device is generally shown at 55.

It Will be apparent to those skilled in the art that many modifications to the illustrated embodiments of the present invention may be used to achieve a multitude of novel and decorative variations without departing from the spirit and scope of the invention as defined by the following claims.

I claim:

1. A combination of an optical information disc with a central aperture and a device for retaining the optical information disc in a pivotal manner in a readily accessible state, the device comprising:

a base member;

at least a partial spherical support surface for the optical information disc located above and secured to the base member;

the spherical support surface having a cross-sectional dimension slightly greater than the central aperture of the optical information disc with the spherical support surface constructed and arranged to receive and loosely engage the optical information disc at the central aperture while allowing the disc to freely and universally pivot thereon in front-to-back and side-to-side directions; and an alignment retention protrusion centrally disposed directly above the spherical support surface for guiding the disc onto the support surface and preventing alighting of the disc therefrom.

2. The combination of claim 1, wherein the base member is conical.

3. The combination of claim 1, wherein the alignment retention protrusion is conical.

4. The combination of claim 1, wherein the alignment retention protrusion is spherical.

5. The combination of claim 1, wherein the device for retaining the optical information disc is unitary in a single form.

\* \* \* \* \*

UNITED STATES PATENT AND TRADEMARK OFFICE
CERTIFICATE OF CORRECTION

PATENT NO. : 6,666,418 B1 Page 1 of 1
DATED : December 23, 2003
INVENTOR(S) : Michael Scanlan It is certified that error appears in the above-identified patent and that said Letters Patent is hereby corrected as shown below:

Column 3,
Line 8, delete "[(1) or two (2)]".
Line 10, "a,single" should read -- a single --.
Lines 14-15, delete "[(1) or two (2)]".
Lines 57-58, delete "[attached and]".

Column 4,
Line 44, delete "[aliened]".

Signed and Sealed this

Twentieth Day of April, 2004

JON W. DUDAS
*Acting Director of the United States Patent and Trademark Office*